(12) United States Patent
Yabuuchi

(10) Patent No.: US 10,422,339 B2
(45) Date of Patent: Sep. 24, 2019

(54) AIR-CONDITIONING APPARATUS AND MOTOR

(75) Inventor: Hironori Yabuuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1028 days.

(21) Appl. No.: 14/344,335

(22) PCT Filed: May 10, 2012

(86) PCT No.: PCT/JP2012/003047
§ 371 (c)(1),
(2), (4) Date: Mar. 12, 2014

(87) PCT Pub. No.: WO2013/105146
PCT Pub. Date: Jul. 18, 2013

(65) Prior Publication Data
US 2014/0348674 A1    Nov. 27, 2014

(30) Foreign Application Priority Data

Jan. 12, 2012 (JP) ................................ 2012-004052

(51) Int. Cl.
*F04D 29/64* (2006.01)
*F04D 25/08* (2006.01)
(Continued)

(52) U.S. Cl.
CPC ............ *F04D 25/08* (2013.01); *F04D 25/06* (2013.01); *F04D 29/644* (2013.01); *H02K 5/10* (2013.01); *H02K 7/14* (2013.01); *F24F 1/0029* (2013.01)

(58) Field of Classification Search
CPC ...... F04D 25/06; F04D 25/062; F04D 25/068; F04D 25/0693; F04D 25/08; F04D 25/12;
(Continued)

(56) References Cited

U.S. PATENT DOCUMENTS 5,117,656 A * 6/1992 Keck .................... F04D 29/601
                                                        417/360
5,497,040 A * 3/1996 Sato ...................... H02K 1/187
                                                        310/156.26
(Continued)

FOREIGN PATENT DOCUMENTS

CN         2715020 Y       8/2005
CN       101368758 A       2/2009
(Continued)

OTHER PUBLICATIONS

Office Action dated Oct. 29, 2015 in the corresponding CN application No. 201280053221.4 (with English translation).
(Continued)

*Primary Examiner* — Bryan M Lettman
*Assistant Examiner* — Charles W Nichols
(74) *Attorney, Agent, or Firm* — Posz Law Group, PLC

(57) ABSTRACT

A body outer shell includes a plurality of first body legs and a plurality of second body legs protruding outward and being disposed at a peripheral edge of an end of the body outer shell, and the end is near the bracket. The bracket includes a plurality of first bracket legs and a plurality of second bracket legs protruding outward and being disposed at a peripheral edge of the bracket. The body outer shell and the bracket are fastened together using the first body legs and the first bracket legs via fixing members. The body outer shell, the bracket, and a support member are fastened together using the second body legs and the second bracket legs via fixing members in a state where the bracket is disposed between the body outer shell and the support member, and the motor and the support member are fixed together.

7 Claims, 9 Drawing Sheets

(51) Int. Cl.
  *H02K 5/10* (2006.01)
  *H02K 7/14* (2006.01)
  *F04D 25/06* (2006.01)
  *F24F 1/0029* (2019.01)
(58) Field of Classification Search
  CPC ........ F04D 29/40; F04D 29/403; F04D 29/52;
       F04D 29/522; F04D 29/60; F04D 29/601;
       F04D 29/602; F04D 29/64; F04D 29/644;
       F04D 29/646; F24F 1/0029; F24F
       2013/205; H02K 5/10; H02K 7/14
  USPC ..................................................... 310/71, 90
  See application file for complete search history.

(56) References Cited

U.S. PATENT DOCUMENTS

| | | | | |
|---|---|---|---|---|
| 5,767,596 | A * | 6/1998 | Stark | H02K 5/00 29/596 |
| 6,404,086 | B1 * | 6/2002 | Fukasaku | H02K 7/1166 310/68 B |
| 7,038,342 | B2 * | 5/2006 | Icarre | H02K 5/00 248/637 |
| 7,301,253 | B2 * | 11/2007 | Tang | F04D 25/08 248/603 |
| 2009/0162203 | A1 * | 6/2009 | Yoo | F04D 25/08 416/179 |
| 2011/0150632 | A1 * | 6/2011 | Heli | B01D 46/001 415/121.2 |

FOREIGN PATENT DOCUMENTS

| | | |
|---|---|---|
| CN | 201336611 Y | 10/2009 |
| DE | 696 01 917 T2 | 8/1999 |
| EP | 0782240 A1 | 7/1997 |
| JP | 11-201506 A | 7/1999 |
| JP | 11-220844 A | 8/1999 |
| JP | 11-275813 A | 10/1999 |
| JP | 2004-364423 A | 12/2004 |

OTHER PUBLICATIONS

Chinese Office Action was dated Jun. 20, 2016 in the corresponding CN application No. 201280053221.4(English abstract attached).
Extended European Search Report dated Aug. 21, 2015 issued in corresponding EP patent application No. 12865419.1.
International Search Report of the International Searching Authority dated Jun. 12, 2012 for the corresponding international application No. PCT/JP2012/003047 (and English translation).
Office Action dated Dec. 26, 2016 issued in corresponding CN patent application No. 201280053221.4 (and English translation).
Communication pursuant to Article 94(3) EPC was dated Aug. 12, 2016 in the corresponding EP application No. 2 865 419.1.
Office Action dated Apr. 25, 2017 issued in corresponding CN patent application No. 201280053221.4 (and English translation).

* cited by examiner

F I G. 5
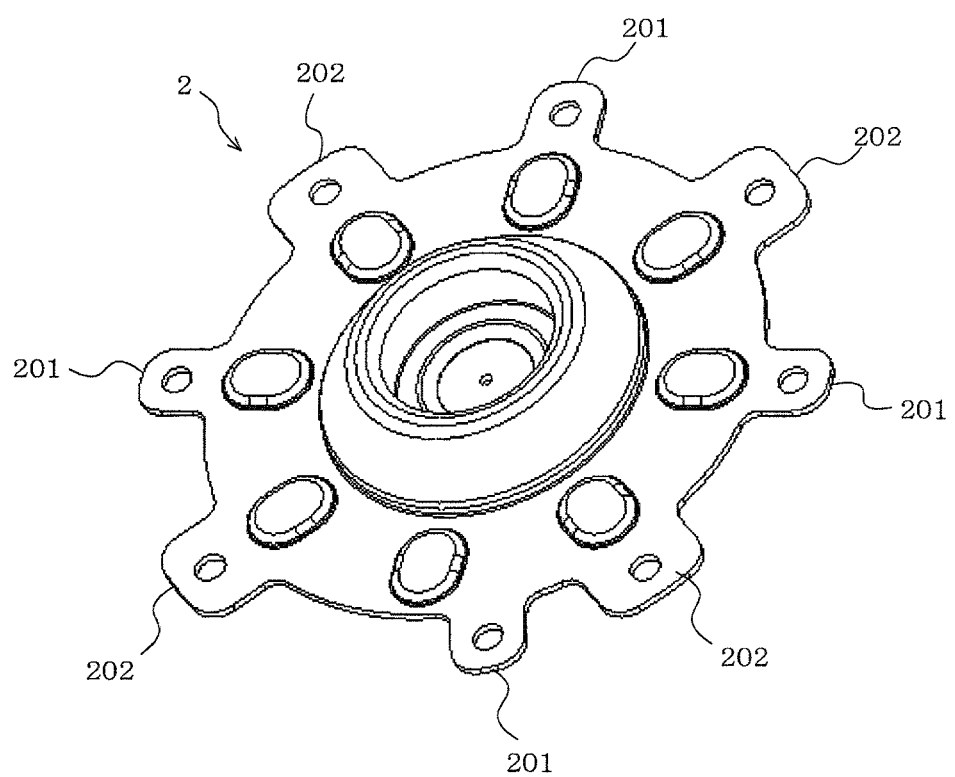

⇒ CURRENT OF AIR

AIR-CONDITIONING APPARATUS AND MOTOR

CROSS REFERENCE TO RELATED APPLICATION

This application is a U.S. national stage application of International Application No. PCT/JP2012/003047 filed on May 10, 2012, which claims priority from, and incorporates by reference, Japanese Patent Application No. 2012-004052 filed on Jan. 12, 2012.

TECHNICAL FIELD

The present invention relates to an air-conditioning apparatus and a motor and in particular to a structure for fixing a motor to a support member.

BACKGROUND ART

An example of known air-conditioning apparatuses includes a fan motor for driving an axial fan, the fan motor being supported by a motor clamp that is a support member (see, for example, Patent Literature 1).

An example of known motors is one in which a mold is applied to a stator (see, for example, Patent Literature 2).

Another example of known motors is one in which a stator is attached and fixed to a cover holder and the cover holder is attached and fixed using screw sections disposed on a base and screws (see, for example, Patent Literature 3).

CITATION LIST

Patent Literature

Patent Literature 1: Japanese Unexamined Patent Application Publication No. 11-201506
Patent Literature 2: Japanese Unexamined Patent Application Publication No. 11-275813
Patent Literature 3: Japanese Patent No. 3307888

SUMMARY OF INVENTION

Technical Problem

As in the above-described technique in Patent Literature 1, in the case of the air-conditioning apparatus including the motor mounted therein, for example, condensate in a heat exchanger, moisture accumulated on a lower portion of a housing, and other moisture may be raised by a current of air from a fan and then adhere to the motor. To address this issue, it is desired that the motor has an improved waterproofness.

For the above-described technique in Patent Literature 2, although a mold is applied to a stator, it is difficult to improve the waterproofness between a bracket supporting a bearing for a rotor and the mold. In particular, when the outer shell of the motor is formed of resin by molding, there is an issue that the waterproofness between the mold and the bracket decreases because of distortion that may occur in forming the resin mold or the presence of an ejector for use in extraction from a die.

As in the above-described technique in Patent Literature 3, for the configuration in which a cover holder is attached to a base, there is an issue that the technique is inapplicable to a motor disposed in a housing in which a current of air flows of, for example, an air-conditioning apparatus because in the case of such a motor, an air passage resistance when a current of air created by a fan flows in the vicinity of the motor is large.

For the above-described techniques in Patent Literatures 1 to 3, when a motor is supported inside a housing, because a configuration for fixing the motor and a support member is needed, there is an issue that the structure is complicated.

The present invention has been made to solve the above-described problems. It is an object of the present invention to improve the waterproofness of a motor. It is another object of the present invention to fix a motor to a support member using a simple configuration while improving the waterproofness of the motor.

Solution to Problem

An air-conditioning apparatus according to the present invention includes a fan, a motor, and a support member. The fan is arranged in a housing and configured to take air through an air inlet and blow air that has passed through a heat exchanger from an air outlet. The motor is configured to drive the fan. The motor is placed on and fixed to the support member via fixing members. The motor includes a body outer shell being annular and surrounding a shaft core portion, a stator being fixed to the body outer shell, a rotor being opposite the stator and being rotatably supported via a bearing, and a bracket having a disc shape with a diameter substantially equal to a diameter of the body outer shell, being arranged on an end face of the stator, including a central portion on which the bearing supporting the rotor is attached, and being closely fixed to the body outer shell. The body outer shell includes a plurality of first body legs and a plurality of second body legs. The first and second body legs protrude outward and are disposed at a peripheral edge of an end of the body outer shell, and the end is near the bracket. The bracket includes a plurality of first bracket legs and a plurality of second bracket legs. The first and second bracket legs protrude outward and are disposed in positions corresponding to the first and second body legs at a peripheral edge of the bracket. The body outer shell and the bracket are fastened together using the first body legs and the first bracket legs via the fixing members. The body outer shell, the bracket, and the support member are fastened together using the second body legs and the second bracket legs via the fixing members in a state where the bracket is disposed between the body outer shell and the support member, and the motor and the support member are fixed together.

A motor according to the present invention is placed on a support member and fixed to the support member via fixing members. The motor includes a body outer shell, a stator, a rotor, and a bracket. The body outer shell is annular and surrounds a shaft core portion. The stator is fixed to the body outer shell. The rotor is opposite the stator and rotatably supported via a bearing. The bracket has a disc shape with a diameter substantially equal to a diameter of the body outer shell, is arranged on end face of the stator, includes a central portion on which the bearing supporting the rotor is attached, and is closely fixed to the body outer shell. The body outer shell includes a plurality of first body legs and a plurality of second body legs. The first and second body legs protrude outward and are disposed at a peripheral edge of an end of the body outer shell, the end is near the bracket. The bracket includes a plurality of first bracket legs and a plurality of second bracket legs. The first and second bracket legs protrude outward and are disposed in positions corresponding to the first and second body legs at a peripheral edge of the bracket. The body outer shell and the bracket are fastened together using the first body legs and the first bracket legs via the fixing members. The body outer shell, the bracket, and the support member are fastened together using the second body legs and the second bracket legs via the fixing members in a state where the bracket is disposed between the body outer shell and the support member, and the motor and the support member are fixed together.

Advantageous Effects of Invention

The present invention can improve the waterproofness of a motor. The present invention can also fix a motor to a support member using a simple structure while improving the waterproofness of the motor.

BRIEF DESCRIPTION OF DRAWINGS

FIG. 5 is a perspective view that illustrates the bracket in the motor according to Embodiment 1.

DESCRIPTION OF EMBODIMENTS

Embodiment 1

Figure 1:
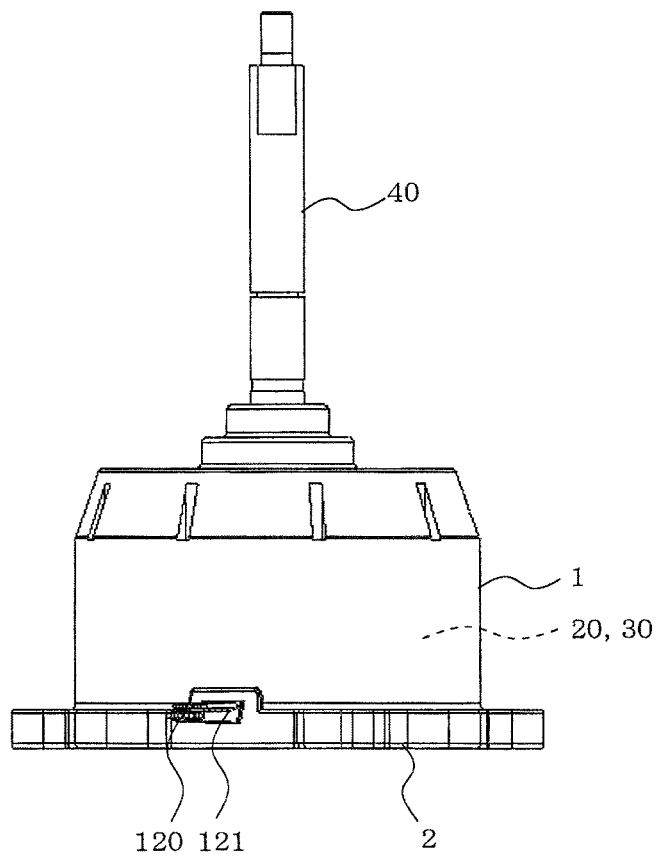
FIG. 1 is a side view that illustrates a motor according to Embodiment 1.

FIG. 1 is a side view that illustrates a motor according to Embodiment 1.

As illustrated in FIG. 1, the motor according to Embodiment 1 includes a body outer shell 1, a stator 20 and a rotor 30 contained in the body outer shell 1, a shaft 40 coupled to the rotor 30, and a bracket 2 closing an end of the body outer shell 1. A lead section 121 for a lead wire 120 connected to the stator 20 is disposed on a side of the body outer shell 1.

Figure 2:
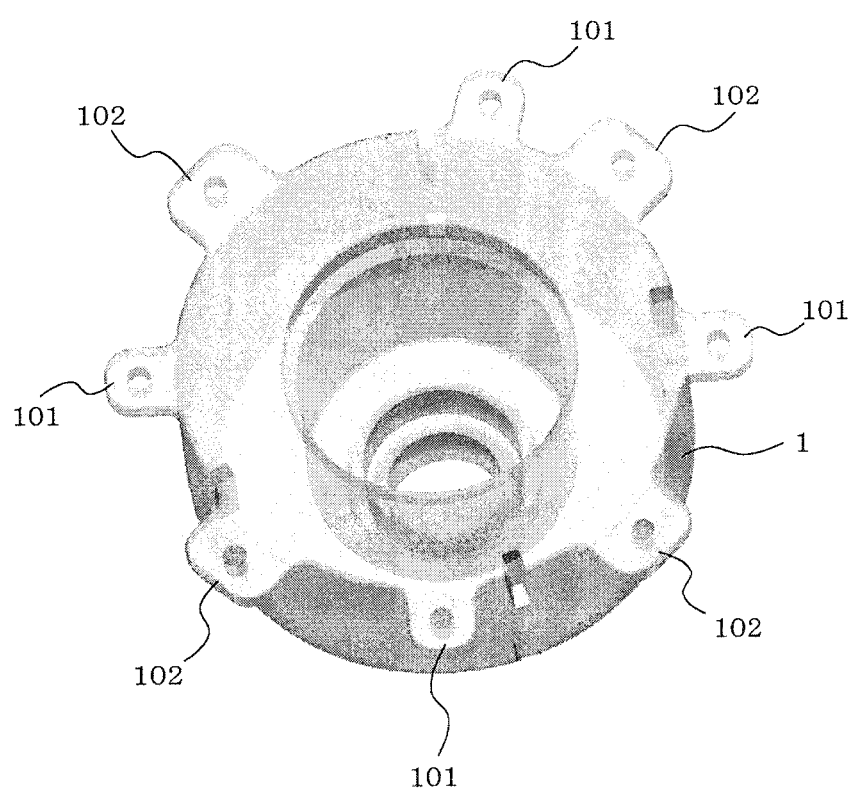
FIG. 2 is a perspective view that illustrates a body outer shell of the motor according to Embodiment 1.

FIG. 2 is a perspective view that illustrates the body outer shell of the motor according to Embodiment 1.

Figure 3:
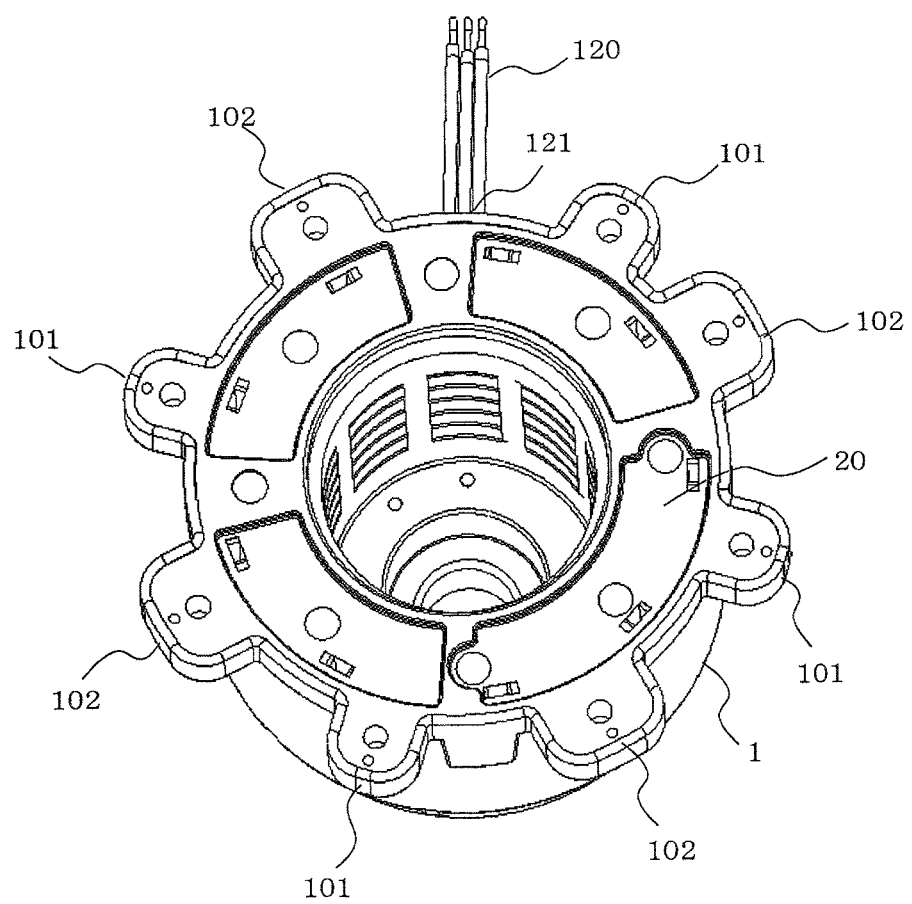
FIG. 3 is a perspective view that illustrates the body of the motor according to Embodiment 1.

FIG. 3 is a perspective view that illustrates the body of the motor according to Embodiment 1.

As illustrated in FIGS. 2 and 3, the body outer shell 1 surrounds a shaft core portion and is substantially annular. The stator 20 is fixed inside the body outer shell 1. The rotor 30 (not illustrated) rotatably supported via a bearing is arranged within the stator 20.

Here, a case where the body outer shell 1 is the outer shell of a molded stator in which the stator 20 is formed of resin by molding is described by way of example.

The resin is not limited to a particular type. Examples of the resin may include unsaturated polyester, saturated polyester, and foamable resin. In Embodiment 1, integral forming using resin is described by way of example. The forming method is not limited to forming using resin. Examples of the forming method may include aluminum die casting and the use of a metal cut product.

The body outer shell 1 includes a plurality of first body legs 101 and a plurality of second body legs 102. The first body legs 101 and the second body legs 102 protrude outward and are disposed at the peripheral edge of an end of bracket side of the body outer shell 1. The first body legs 101 and the second body legs 102 are integrally formed of resin of which the body outer shell 1 is made.

The first body legs 101 are used for fastening the body outer shell 1 and the bracket 2 together via fixing members, such as screws. The second body legs 102 are used for fastening the body outer shell 1 and the bracket 2 together via fixing members, such as screws, and for fixing the motor and a support member 320 (described below). The details of a fixed state are described below.

The second body legs 102 may consist of four second body legs 102 arranged around the shaft core portion of the body outer shell 1 and spaced at intervals of 90 degrees, for example. Each of the first body legs 101 is arranged between its adjacent second body legs 102.

The first body legs 101 and the second body legs 102 are in positions that do not overlap the lead section 121 for the lead wire 120 when seen in plan view. For example, as illustrated in FIG. 2, the gap between the first body leg 101 close to the lead section 121 for the lead wire 120 and one of the second body legs 102 that is adjacent to that first body leg 101 is narrower than the other gaps.

In Embodiment 1, the disposition of the lead section 121 for the lead wire 120 on the side can improve productivity in forming the body outer shell 1 of resin and can improve the waterproofness of the bottom of the motor (the bracket 2 side). Because the first body legs 101 and the second body legs 102 are in positions that do not overlap the lead section 121 for the lead wire 120 when seen in plan view, the lead wire 120 and each of the first body legs 101 and the second body legs 102 do not interfere with each other, and the mounting workability can be improved.

Figure 4:
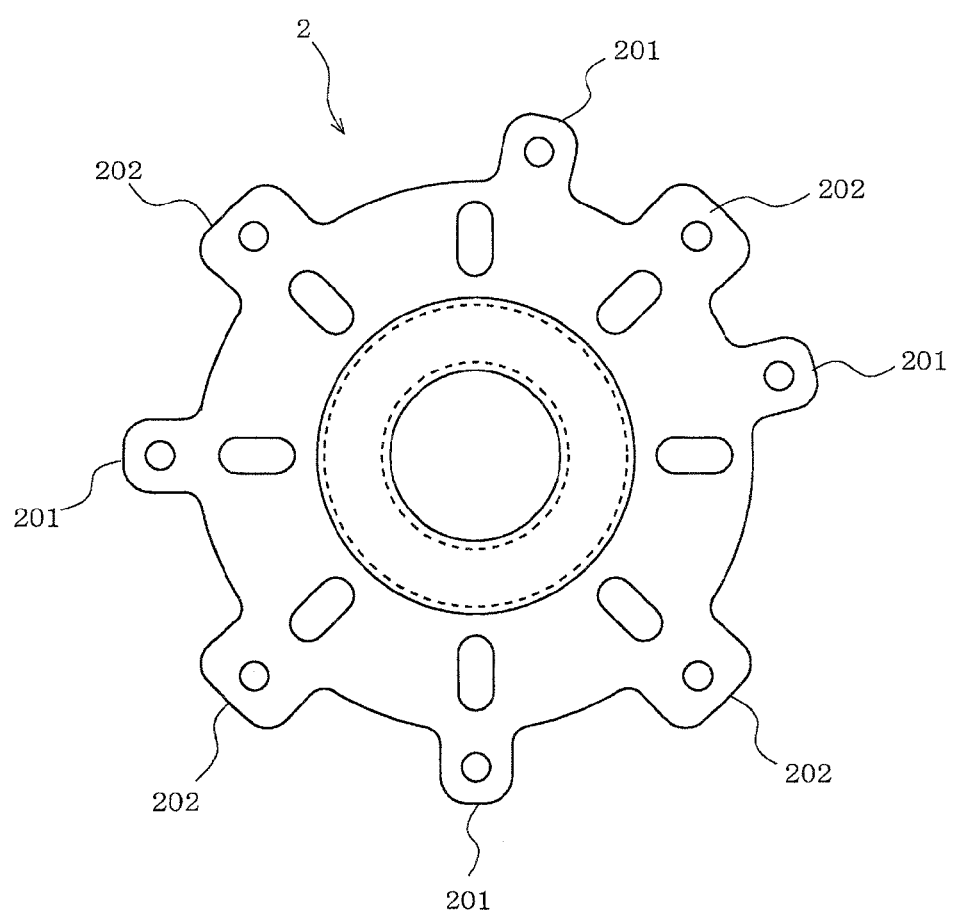
FIG. 4 is a plan view that illustrates a bracket in the motor according to Embodiment 1.

FIG. 4 is a plan view that illustrates the bracket in the motor according to Embodiment 1.

FIG. 5 is a perspective view that illustrates the bracket in the motor according to Embodiment 1.

As illustrated in FIGS. 4 and 5, the bracket 2 has a disc shape with a diameter substantially equal to that of the body outer shell 1. The bracket 2 is arranged on an end face of the stator 20 and includes a central portion on which the bearing for supporting the rotor 30 is attached. The outer edge of the bracket 2 is fixed to the body outer shell 1.

The bracket 2 includes a plurality of first bracket legs 201 and a plurality of second bracket legs 202. The first bracket legs 201 and the second bracket legs 202 protrude outward and are disposed in positions corresponding to the above-described first body legs 101 and second body legs 102 at the peripheral edge of the bracket 2.

The first bracket legs 201 are used for fastening the body outer shell 1 and the bracket 2 together via fixing members, such as screws. The second bracket legs 202 are used for fastening the body outer shell 1 and the bracket 2 together via fixing members, such as screws, and for fixing the motor and the support member 320 (described below). The details of a fixed state are described below.

Next, an air-conditioning apparatus (outdoor unit) including the motor mounted therein and a fixed state of the motor according to Embodiment 1 are described.

Figure 6:
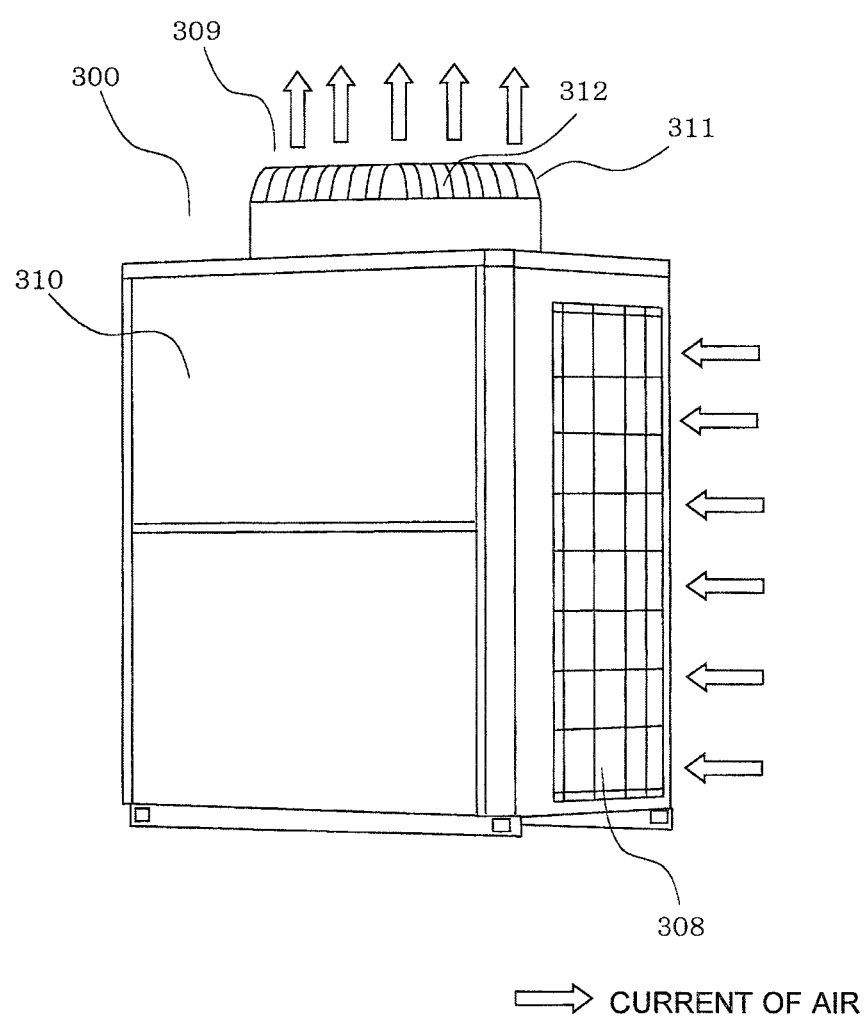
FIG. 6 is an external view of an outdoor unit according to Embodiment 1.

FIG. 6 is an external view of an outdoor unit according to Embodiment 1.

As illustrated in FIG. 6, an outdoor unit 300 includes a housing 310 having a box shape, an air inlet 308 defined by an opening in a side of the housing 310, a heat exchanger (not illustrated) arranged inside the housing 310 along the air inlet 308, an air outlet 309 defined by an opening in a top of the housing 310, a fan guard 311 covering the air outlet 309 while allowing air to flow therethrough, and a fan 312 arranged inside the fan guard 311 and driven by the above-described motor.

In the outdoor unit 300 having the above-described configuration, when the fan 312 is rotated, air is taken into the housing 310 through the air inlet 308 in the side of the housing 310, passes through the heat exchanger, and then vertically flows, and the current of air is blown upwardly from the air outlet 309 in the upper portion of the housing 310. For such a top flow configuration, condensate in the heat exchanger or moisture accumulated on the lower portion of the housing 310 may be raised by a current of air and then adhere to the motor driving the fan 312. To address this issue, it is desired that the portion where the body outer shell 1 and the bracket 2 in the motor are joined have an improved waterproofness. In addition, because a current of air flows in the vicinity of the motor, it is desired that the air passage resistance be reduced.

Figure 7:
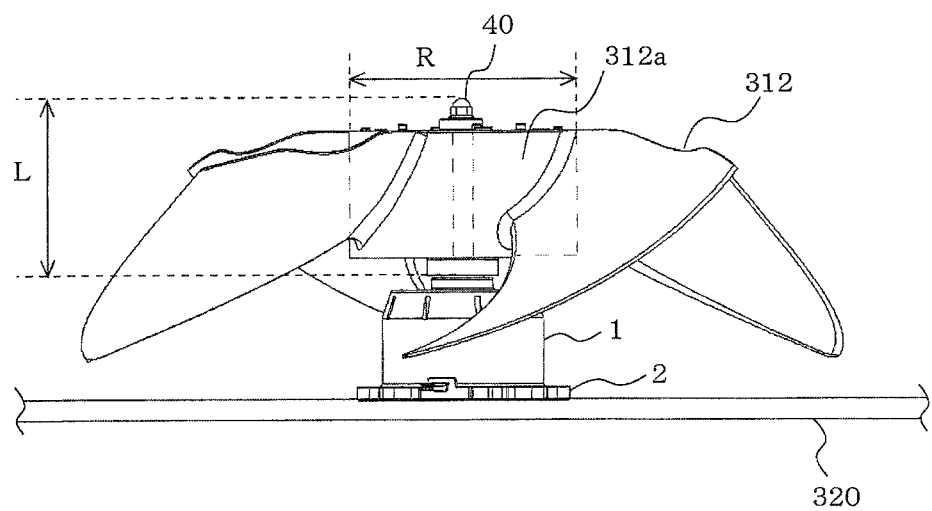
FIG. 7 is a side view that illustrates a fan and the motor in the outdoor unit according to Embodiment 1.

FIG. 7 is a side view that illustrates the fan and the motor in the outdoor unit according to Embodiment 1.

In FIG. 7, the support member 320 may include two rails, for example, and the motor is placed such that its bottom side (the the bracket 2 side) is in contact with the support member 320 and the shaft 40 faces upward. The fan 312 is attached to the shaft 40 of the motor and is driven by rotation of the rotor in the motor.

Here, the length of the shaft 40 is set such that a predetermined gap exists between the lower end of each of the blades of the fan 312 and the support member 320. In Embodiment 1, because the motor is placed and fixed on the support member 320, the length L of the shaft 40 can be shorter than that when the central portion of the motor is supported. The reduced length of the shaft 40 can result in reduction in axial movement of the fan 312.

The motor according to Embodiment 1 is configured such that its diameter (diameter of the body outer shell 1) is smaller than the diameter R of a boss 312a of the fan 312 when seen in plan view. With such a configuration, the resistance to a current of air upward from below the motor can be reduced.

Figure 8:
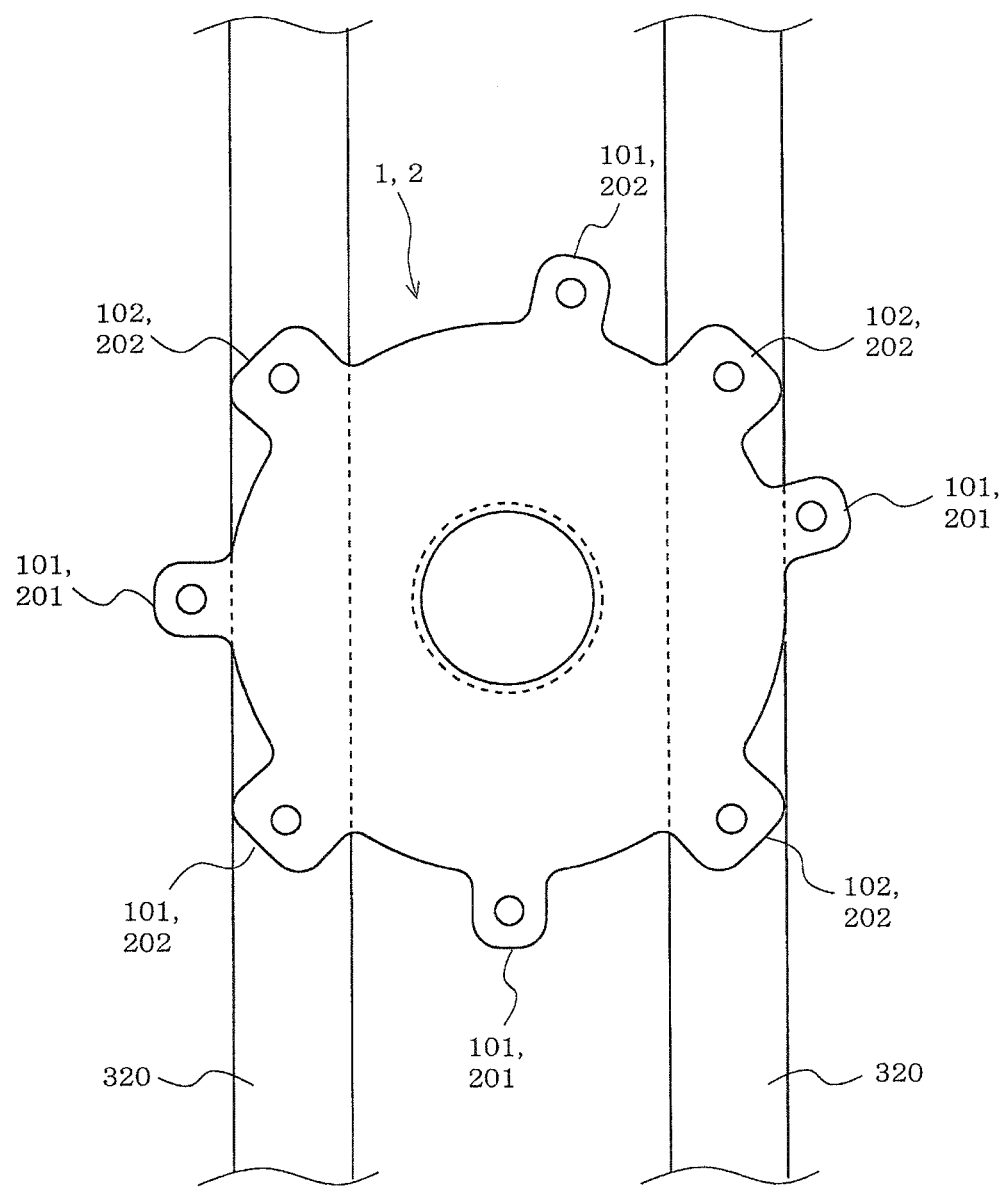
FIG. 8 is a plan view that illustrates a position where the motor in the outdoor unit is fixed according to Embodiment 1.

FIG. 8 is a plan view that illustrates a position where the motor in the outdoor unit is fixed according to Embodiment 1.

As illustrated in FIG. 8, the support member 320 includes two rails. Of the four second body legs 102 and the four second bracket legs 202, which are arranged around the shaft core portion of the body outer shell 1 and spaced at intervals of 90 degrees, two second body legs 102 and two second bracket legs 202 are fastened on one rail, and the other two second body legs 102 and the other two second bracket legs 202 are fastened on the other rail. With such a configuration, the resistance to a current of air upward from below the motor can be reduced.

Figure 9:
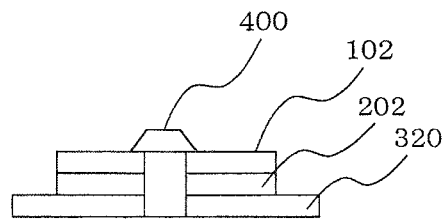
FIG. 9 is a schematic view that illustrates a multilayer structure of the motor and a support member according to Embodiment 1.

FIG. 9 is a schematic view that illustrates a multilayer structure of the motor and the support member according to Embodiment 1.

As illustrated in FIG. 9, the second bracket leg 202 of the bracket 2 and the second body leg 102 of the body outer shell 1 are arranged above the support member 320, these three components are fastened with a screw 400, and the motor and the support member 320 are fixed together.

As described above, in Embodiment 1, the second body leg 102, the second bracket leg 202, and the support member 320 are fastened together in a state where the bracket 2 is disposed between the body outer shell 1 and the support member 320 by the weight of the motor, the second body leg 102.

Thus the motor is fixed to the support member 320, the body outer shell 1 and the bracket 2 are fastened together by the weight of the motor and the fixing member such that they are in close contact with each other, and the waterproof performance can be improved.

Figure 10:
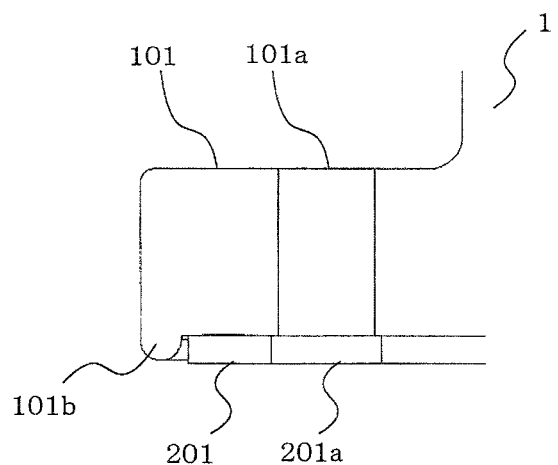
FIG. 10 is a partial enlarged view that illustrates a state where the body outer shell and the bracket are fastened together according to Embodiment 1.

FIG. 10 is a partial enlarged view that illustrates a state where the body outer shell and the bracket are fastened together according to Embodiment 1.

As illustrated in FIG. 10, the first body leg 101 in the body outer shell 1 has a screw hole 101a. The first bracket leg 201 in the bracket 2 has a screw hole 201 a. The body outer shell 1 and the bracket 2 are fastened together by inserting the screw 400 into the screw holes 101a and 201a.

Here, the screw 400 is described as an example of the fixing member. The fixing member is not limited to a screw. For example, the fixation may be made using a rivet or by insertion of a metal bar.

The first body leg 101 in the body outer shell 1 may include an end face cover 101b for preventing the end face of the bracket 2 from being visible and for improving its aesthetic appearance.

Figure 11:
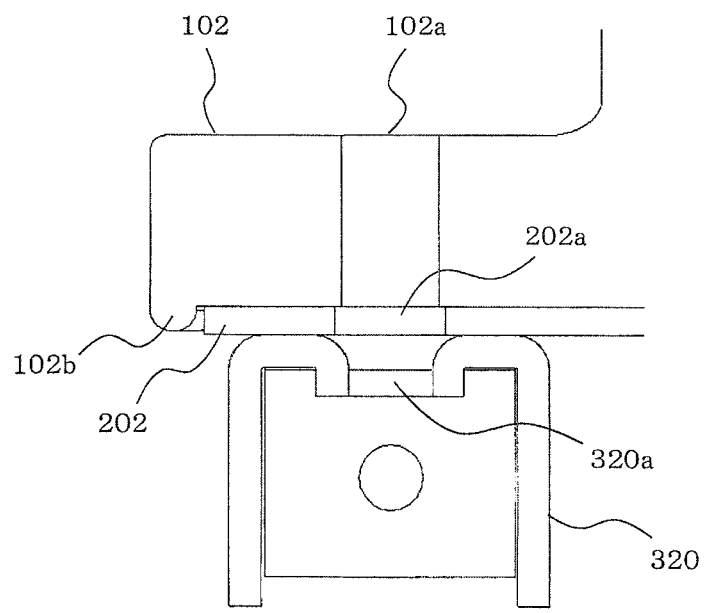
FIG. 11 is a partial enlarged view that illustrates a state where the body outer shell, the bracket, and the support member are fastened together according to Embodiment 1.

FIG. 11 is a partial enlarged view that illustrates a fastened state of the body outer shell, the bracket, and the support member according to Embodiment 1.

As illustrated in FIG. 11, the second body leg 102 in the body outer shell 1 has a screw hole 102a. The second bracket leg 202 in the bracket 2 has a screw hole 202a. The support member 320 has a screw hole 320a. The body outer shell 1, the bracket 2, and the support member 320 are fastened together by inserting the screw 400 into the screw holes 102a, 202a, and 320a.

Here, the screw 400 is described as an example of the fixing member. The fixing member is not limited to a screw. For example, the fixation may be made using a rivet or by insertion of a metal bar.

The second body leg 102 in the body outer shell 1 may include an end face cover 102b for preventing the end face of the bracket 2 from being visible and for improving its aesthetic appearance.

Here, it is necessary that a screw capable of absorbing a shear force to rotation of the motor be selected as the screw 400 for fastening the second body leg 102, the second bracket leg 202, and the support member 320.

A typical motor has a shear force of the order of 10 N to 20 N. In consideration of a shear stress of a screw, a screw having a diameter of the order of 94 can be assumed to bear that shear force. To have a multiplicity of uses, it is desired that each of the screw holes 102a, 202a, and 320a have a diameter of φ8.

In contrast, no shear force caused by rotation of the motor occurs in the screw 400 for fastening the first body leg 101 and the first bracket leg 201, and it is only required that the motor and the bracket 2 be fixed. Thus a screw that can bear a necessary load can be used as the screw 400. In consideration of the necessary load, which of course varies depending on the design of the motor, a screw hole having a diameter of φ8 can enable the body outer shell 1 and the bracket to be sufficiently fixed.

Because the fixation between the body outer shell 1 and the bracket 2 increases with an increase in the weight of the motor, it is not necessary to increase the diameter of each of the screw holes 101a and 201a.

The width of the second body leg 102 (width in the circumferential direction and width in the diameter direction) is larger than the width of the first body leg 101. As previously described, because the second body leg 102 is fastened to the second bracket leg 202 and the support member 320, the fastening force by the screw 400 for the second body leg 102 is larger than that for the first body leg 101. This is why the second body leg 102 is wider than the first body leg 101. In contrast, because the first body leg 101 is fastened to only the first bracket leg 201, the fastening force therefor is small, and the first body leg 101 can have a width smaller than that of the second body leg 102. For example, the width of the first body leg 101 may preferably be set so as to have a dimension corresponding to the dimensions of the bearing surface of the used screw 400, for example, a minimum dimension specified by, for example, the Japanese Industrial Standards (WS).

A reduction in the dimensions of the leg of the body outer shell 1 can lead to a reduction in the cost of materials of the body outer shell 1. When the body outer shell 1 is formed of resin, drawbacks, such as those occurring in forming using metal, can be reduced.

As described above, in Embodiment 1, the body outer shell 1 and the bracket 2 are fastened together using the first body legs 101 and the first bracket legs 102 via the fixing members, and the body outer shell 1, the bracket 2, and the support member 320 are fastened together using the second body legs 102 and the second bracket legs 202 via the fixing members in a state where the bracket 2 is disposed between the body outer shell 1 and the support member 320, and the motor and the support member 320 are fixed.

Thus water or other objects can be prevented from entering a gap between the body outer shell 1 and the bracket 2 in the motor by capillary action or the like. The motor can be fixed to the support member 320.

Because the second body legs 102, the second bracket legs 202, and the support member 320 are fastened together in a state where the bracket 2 is disposed between the body outer shell 1 and the support member 320 by the weight of the motor, the waterproofness of the motor can be improved.

Because the body outer shell 1 and the bracket 2 are fastened together and the motor is fixed to the support member 320, the configuration for fixing the motor and the support member 320 can be simplified.

In Embodiment 1, the body outer shell 1 is the outer shell of the stator 20 formed of resin by molding, and the body legs are integrally formed of resin.

Thus there is no need to have an additional configuration for fixing the motor and the support member 320, and the motor can be fixed to the support member 320 using a simple configuration. Even when the body outer shell 1 is formed of resin, the degree of contact between the body outer shell 1 and the bracket 2 can be enhanced, and the waterproofness of the motor can be improved.

In Embodiment 1, the support member 320 includes two rails, on each of which two second body legs 102 and two second bracket legs 202 are fastened.

Thus when the motor is arranged in a housing of, for example, an air-conditioning apparatus, an air passage resistance when a current of air created by the fan 312 flows in the vicinity of the motor can be reduced.

In Embodiment 1, the motor for driving the fan 312 is described as being mounted inside the housing 310 of the air-conditioning apparatus (outdoor unit). The present invention is not limited to such a motor. The present invention is also applicable to a motor placed on a support member and fixed to this support member via a fixing member. In that case, substantially the same advantageous effects are obtainable.

REFERENCE SIGNS LIST 1 body outer shell 2 bracket 20 stator 30 rotor 40 shaft 101 first body leg 101a screw hole 101b end face cover 102 second body leg 102a screw hole 102b end face cover 120 lead wire 121 lead section 201 first bracket leg 201a screw hole 202 second bracket leg 202a screw hole 300 outdoor unit 308 air inlet 309 air outlet 310 housing 311 fan guard 312 fan 312a boss 320 support member 320a screw hole 400 screw

The invention claimed is:

1. An air-conditioning apparatus comprising:
a fan arranged in a housing and configured to take air through an air inlet and blow air that has passed through a heat exchanger from an air outlet;
a motor configured to drive the fan; and
a support member on which the motor is placed and to which the motor is fixed via fixing members,
wherein the motor includes
a body outer shell being annular and surrounding a shaft core portion,
a stator being fixed to the body outer shell,
a rotor being opposite the stator and being rotatably supported via a bearing, and
a bracket having a disc shape with a diameter substantially equal to a diameter of the body outer shell, being arranged on an end face of the stator, including a central portion on which the bearing supporting the rotor is attached, and being closely fixed to the body outer shell,
the body outer shell includes a plurality of first body legs and a plurality of second body legs, the first and second body legs protruding outward and being disposed at a peripheral edge of an end of bracket side of the body outer shell, the bracket includes a plurality of first bracket legs and a plurality of second bracket legs, the first and second bracket legs protruding outward and being disposed in positions corresponding to the first and second body legs at a peripheral edge of the bracket,
the body outer shell and the bracket are fastened together using the first body legs and the first bracket legs via the fixing members, and
the body outer shell, the bracket, and the support member are fastened together using the second body legs and the second bracket legs via the fixing members in a state where the bracket is disposed between the body outer shell and the support member, thereby fixing the motor and the support member together,
wherein
the rotor is inside the stator,
a lead section for a lead wire connected to the stator is disposed on a side of the body outer shell, the first and second body legs are in positions that do not overlap the lead section for the lead wire in plan view, and each of the first body legs is arranged between adjacent second body legs.

2. The air-conditioning apparatus of claim 1, wherein the body outer shell is formed with an outer shell of a molded stator in which the stator is formed of resin by molding, and the first body legs and the second body legs are integrally formed of the resin.

3. The air-conditioning apparatus of claim 1, wherein the second body legs and the second bracket legs are wider than the first body legs and the first bracket legs.

4. The air-conditioning apparatus of claim 1, wherein the second body legs includes four second body legs arranged around the shaft core portion of the body outer shell and spaced at intervals of 90 degrees, the second bracket legs includes four second bracket legs arranged around the shaft core portion of the body outer shell and spaced at intervals of 90 degrees, the support member includes two rails, and of the second body legs and the second bracket legs, two second body legs and two second bracket legs are fastened on one of the two rails.

5. The air-conditioning apparatus of claim 1, wherein the motor has a diameter smaller than a diameter of a boss of the fan in plan view.

6. The air-conditioning apparatus of claim 1, wherein the fixing members are screws.

7. The air-conditioning apparatus of claim 1, wherein the second body legs and the second bracket legs overlap the support member, and the first body legs and the first bracket legs do not overlap the support member.

\* \* \* \* \*